(12) United States Patent
Kegasawa et al.

(10) Patent No.: US 12,285,938 B2
(45) Date of Patent: Apr. 29, 2025

(54) DIELECTRIC HEATING DEVICE AND PRINTING SYSTEM

(71) Applicant: SEIKO EPSON CORPORATION, Tokyo (JP)

(72) Inventors: Kazuyoshi Kegasawa, Hara (JP); Tadashi Aizawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 211 days.

(21) Appl. No.: 18/166,798

(22) Filed: Feb. 9, 2023

(65) Prior Publication Data

US 2023/0249478 A1    Aug. 10, 2023

(30) Foreign Application Priority Data

Feb. 10, 2022  (JP) .................. 2022-019172

(51) Int. Cl.
*B41J 11/00* (2006.01)
*H02M 7/44* (2006.01)
*H05B 6/50* (2006.01)
*H05B 6/62* (2006.01)

(52) U.S. Cl.
CPC ......... *B41J 11/00242* (2021.01); *H02M 7/44* (2013.01); *H05B 6/50* (2013.01); *H05B 6/62* (2013.01)

(58) Field of Classification Search
CPC .............. H02M 7/44; B41J 11/00242; B41J 11/00212; B41J 11/00216; H05B 6/50; H05B 6/62; H05B 1/0236; H05B 2203/003; H05B 2203/013; H05B 2214/02; H05B 3/26

See application file for complete search history.

(56) References Cited

U.S. PATENT DOCUMENTS

| | | | |
|---|---|---|---|
| 10,232,641 B2 * | 3/2019 | Yamada | F26B 3/34 |
| 2017/0066254 A1 * | 3/2017 | Inoue | B41J 11/00216 |
| 2022/0063269 A1 * | 3/2022 | Aizawa | B41J 11/00216 |

FOREIGN PATENT DOCUMENTS

| | | | |
|---|---|---|---|
| JP | 2001-301131 A | 10/2001 | |
| WO | WO-2020027240 A1 * | 2/2020 | H03H 7/38 |

* cited by examiner

*Primary Examiner* — Sharon Polk
(74) *Attorney, Agent, or Firm* — Harness, Dickey & Pierce, P.L.C.

(57) ABSTRACT

A dielectric heating device includes: an electrode unit including a first electrode and a second electrode that face a to-be-heated object, and configured to heat the to-be-heated object; a voltage application unit configured to apply an alternating-current voltage to the first electrode and the second electrode; a current value detection unit configured to detect a current value of an alternating current that flows through the electrode unit; a phase difference detection unit configured to detect a phase difference between the alternating-current voltage and the alternating current; an impedance detection unit configured to detect an impedance of the electrode unit based on the current value and the phase difference; and a control unit configured to control output of alternating-current power output to the electrode unit by controlling the voltage application unit based on the impedance.

8 Claims, 7 Drawing Sheets

DIELECTRIC HEATING DEVICE AND PRINTING SYSTEM

The present application is based on, and claims priority from JP Application Serial Number 2022-019172, filed Feb. 10, 2022, the disclosure of which is hereby incorporated by reference herein in its entirety.

BACKGROUND

1. Technical Field

The present disclosure relates to a dielectric heating device and a printing system.

2. Related Art

Regarding a dielectric heating device, JP-A-2001-301131 discloses performing feedback control on output of a high-frequency heating unit including a magnetron based on a water content of a recording medium measured by a water content sensor. According to this, a heating amount of the recording medium can be adjusted according to a dryness degree of the recording medium.

However, in the technique of JP-A-2001-301131, it is necessary to provide the sensor for measuring the water content of the recording medium at a position corresponding to the recording medium. For example, when the sensor is implemented by a capacitive moisture meter, it is necessary to provide the sensor at a position at which the sensor can be in contact with the recording medium, and when the sensor is implemented by an optical moisture meter or a high-frequency moisture meter, it is necessary to provide the sensor at a position at which the sensor can face the recording medium.

SUMMARY

According to a first aspect of the present disclosure, a dielectric heating device is provided. The dielectric heating device includes: an electrode unit including a first electrode and a second electrode that face a to-be-heated object, and configured to heat the to-be-heated object; a voltage application unit configured to apply an alternating-current voltage to the first electrode and the second electrode; a current value detection unit configured to detect a current value of an alternating current that flows through the electrode unit; a phase difference detection unit configured to detect a phase difference between the alternating-current voltage and the alternating current; an impedance detection unit configured to detect an impedance of the electrode unit based on the current value and the phase difference; and a control unit configured to control output of alternating-current power output to the electrode unit by controlling the voltage application unit based on the impedance.

According to a second aspect of the present disclosure, a printing system is provided. The printing system includes: the dielectric heating device according to the above-described aspect; and a discharging unit configured to discharge a liquid to a printing medium and to cause the liquid to adhere to the printing medium. The electrode unit heats the printing medium to which the liquid adheres as the to-be-heated object.

DESCRIPTION OF EXEMPLARY EMBODIMENTS

A. First Embodiment

Figure 1:
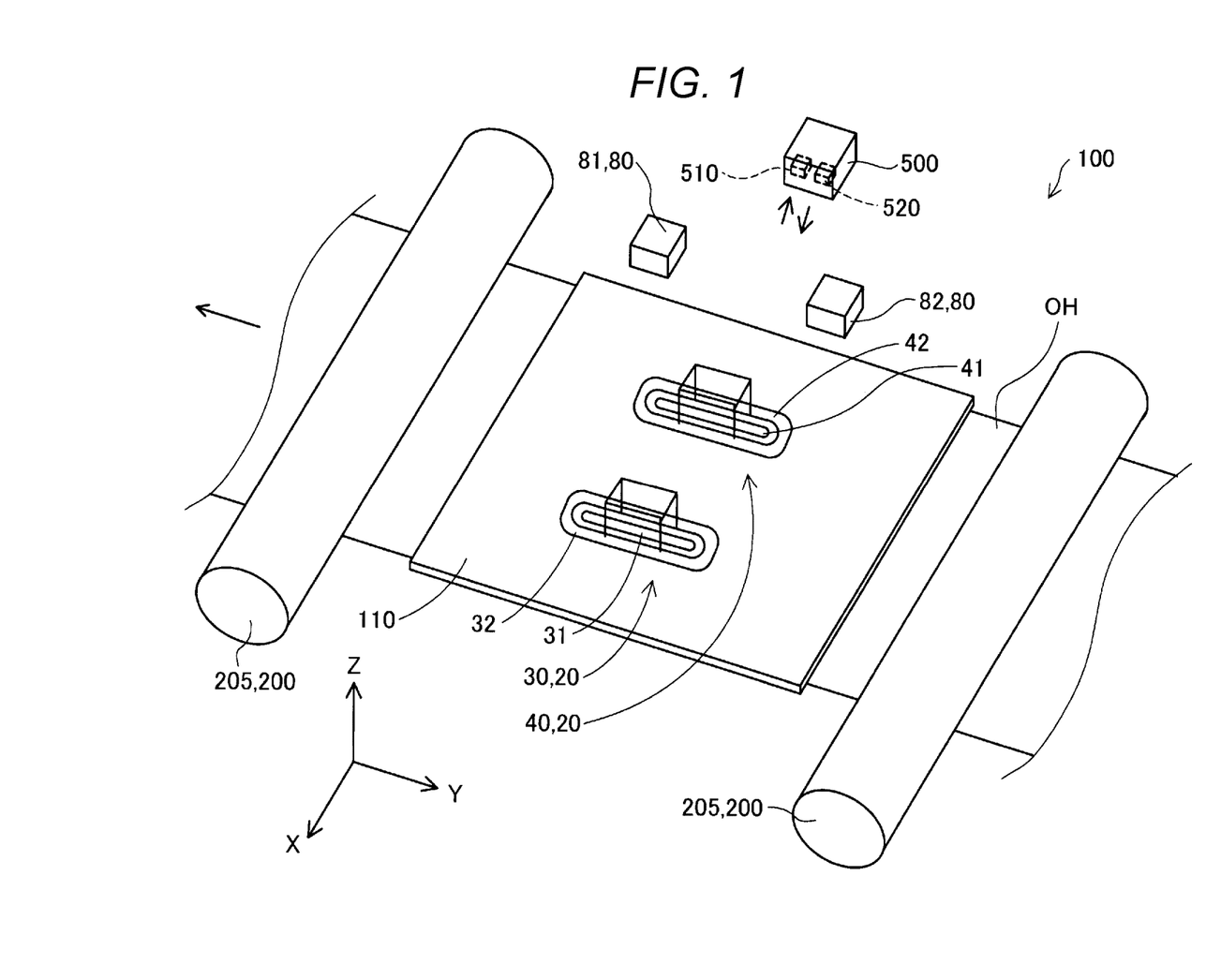
FIG. 1 is a perspective view showing a schematic configuration of a dielectric heating device.

FIG. 1 is a perspective view showing a schematic configuration of a dielectric heating device 100 according to a first embodiment. FIG. 1 shows arrows indicating X, Y, and Z directions orthogonal to one another. The X direction and the Y direction are directions parallel to a horizontal plane, and the Z direction is a direction along a vertically upward direction. The arrows indicating the X, Y, and Z directions are also appropriately shown in other drawings such that the shown directions correspond to those in FIG. 1. In the following description, when a direction is specified, a direction indicated by an arrow in each drawing is referred to as "+", a direction opposite thereto is referred to as "−", and positive and negative signs are used in combination in a direction notation. Hereinafter, a +Z direction is referred to as "upper", and a −Z direction is referred to as "lower". Further, in the present specification, the term "orthogonal" includes a range of 90°±10°.

The dielectric heating device 100 includes an electrode unit 20 that heats a to-be-heated object OH, a conveyance unit 200 that conveys the to-be-heated object OH, a voltage application unit 80 that applies an alternating-current voltage to the electrode unit 20, and a control unit 500.

The dielectric heating device 100 according to the present embodiment heats the to-be-heated object OH by an electric field generated from the electrode unit 20 while conveying the to-be-heated object OH by the conveyance unit 200. In the present embodiment, the dielectric heating device 100 dries the to-be-heated object OH by heating a sheet-shaped printing medium to which liquids are applied as the to-be-heated object OH. For example, paper, cloth, or a film is used as the printing medium. For example, various inks containing water or an organic solvent as a main component are used as the liquids applied to the printing medium. In the present embodiment, an aqueous ink containing water as a main component is used as the liquid. In the present specification, the main component of the liquid refers to a substance having a mass fraction of 50% or more among substances contained in the liquid. The liquid is applied to the printing medium by, for example, a liquid-discharging device such as an inkjet printer.

The control unit 500 is implemented by a computer including a CPU 510, a storage unit 520, and an input and output interface that inputs and outputs a signal from and to an outside. The control unit 500 executes heating of the to-be-heated object OH in the dielectric heating device 100 by controlling units such as the conveyance unit 200 and the voltage application unit 80. In another embodiment, the control unit 500 may be implemented by, for example, a combination of a plurality of circuits.

The conveyance unit 200 according to the present embodiment includes two roller units 205, and a drive unit (not shown) implemented by a motor or the like that drives the roller units 205. The conveyance unit 200 conveys the sheet-shaped to-be-heated object OH by driving the roller units 205. In another embodiment, the conveyance unit 200 may be implemented by, for example, a belt for conveying while supporting the to-be-heated object OH, and a drive unit that drives the belt.

The dielectric heating device 100 according to the present embodiment includes a first electrode unit 30 and a second electrode unit 40 as the electrode unit 20. The first electrode unit 30 includes a first electrode 31 and a second electrode 32 facing the to-be-heated object OH. The second electrode unit 40 includes a third electrode 41 and a fourth electrode 42 facing the to-be-heated object OH. As shown in FIG. 1, in the present embodiment, the second electrode unit 40 is disposed at a position of the first electrode unit 30 in a −x direction. In the present embodiment, the first electrode unit 30 and the second electrode unit 40 have similar configurations. Hereinafter, when the first electrode unit 30 and the second electrode unit 40 are not distinguished from each other, both the first electrode unit 30 and the second electrode unit 40 may be simply referred to as the electrode unit 20.

The dielectric heating device 100 according to the present embodiment includes a first voltage application unit 81 and a second voltage application unit 82 as the voltage application unit 80. The first voltage application unit 81 is electrically coupled to the first electrode unit 30, and applies an alternating-current voltage to the first electrode 31 and the second electrode 32. The second voltage application unit 82 is electrically coupled to the second electrode unit 40, and applies the alternating-current voltage to the third electrode 41 and the fourth electrode 42. One of potentials applied to the first electrode 31 and the second electrode 32, and one of potentials applied to the third electrode 41 and the fourth electrode 42 may be reference potentials. The reference potential is a constant potential serving as a reference of a high-frequency voltage, and is, for example, a ground potential. Hereinafter, the alternating-current voltage applied to the first electrode unit 30 by the first voltage application unit 81 is also referred to as a first alternating-current voltage. Further, the alternating-current voltage applied to the second electrode unit 40 by the second voltage application unit 82 is also referred to as a second alternating-current voltage.

In the present embodiment, the first voltage application unit 81 and the second voltage application unit 82 have similar configurations. Hereinafter, when the first voltage application unit 81 and the second voltage application unit 82 are not distinguished from each other, both the first voltage application unit 81 and the second voltage application unit 82 may be simply referred to as the voltage application unit 80. In the present embodiment, each voltage application unit 80 applies a high-frequency voltage to the electrodes of the respective electrode unit 20. In the present specification, the "high frequency" refers to a frequency of 1 MHz or more.

Figure 2:
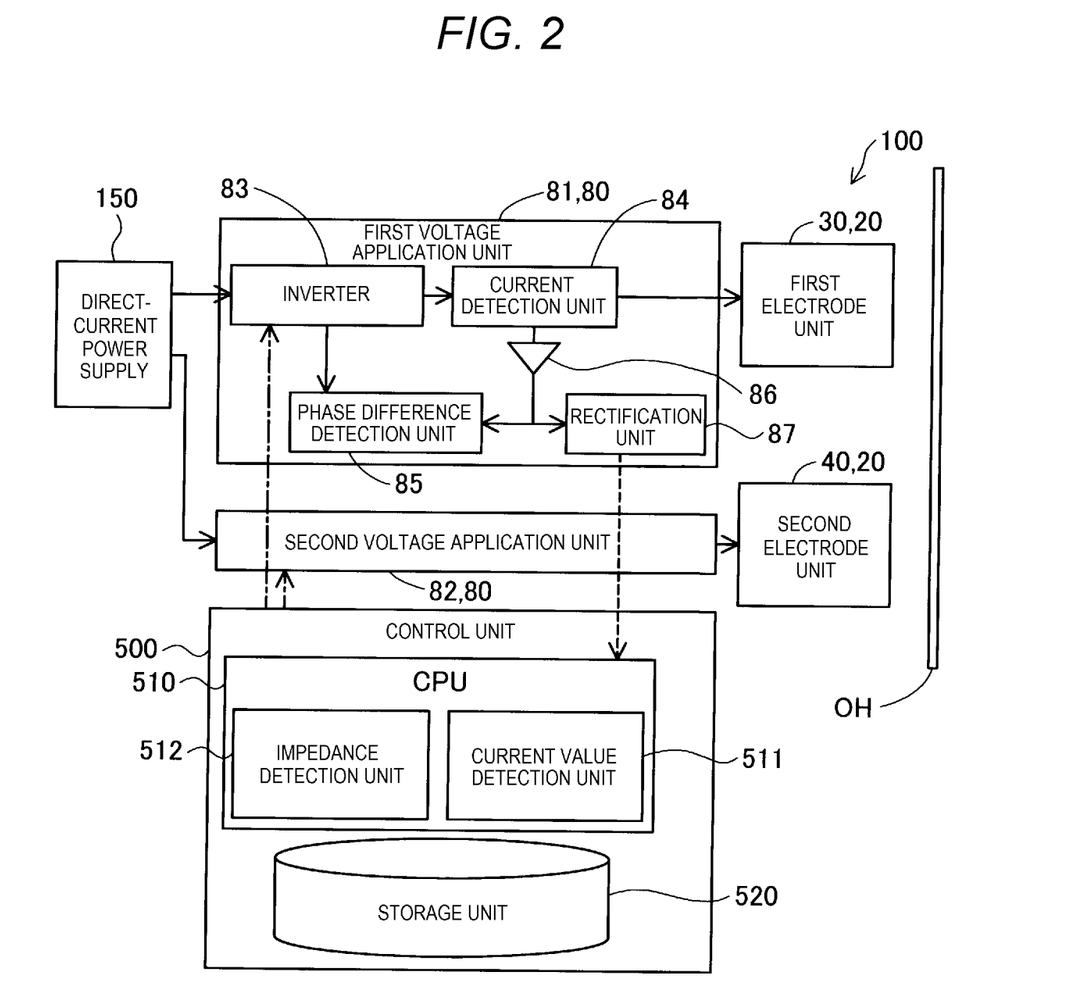
FIG. 2 is a block diagram showing the schematic configuration of the dielectric heating device.

FIG. 2 is a block diagram showing the schematic configuration of the dielectric heating device 100 according to the present embodiment. As shown in FIG. 2, the first voltage application unit 81 according to the present embodiment includes an inverter 83, a current detection unit 84, a phase difference detection unit 85, an amplifier 86, and a rectification unit 87. The first voltage application unit 81 is electrically coupled to a direct-current power supply 150. Although illustration is omitted, the second voltage application unit 82 also similarly includes the inverter 83 and the like described above, and is electrically coupled to the direct-current power supply 150.

The inverter 83 provided in each voltage application unit 80 is electrically coupled to the direct-current power supply 150 and the respective electrode unit 20. The inverter 83 converts a direct-current voltage received from the direct-current power supply 150 to the inverter 83 into an alternating-current voltage to output the alternating-current voltage to the electrode unit 20. More specifically, the inverter 83 includes a switching transistor, and converts the direct-current voltage input to the inverter 83 into the alternating-current voltage having a rectangular wave-shaped waveform with a frequency $f_1$ to output the alternating-current voltage to the electrode unit 20 by an operation of the transistor.

The current detection unit 84 provided in each voltage application unit 80 is implemented as a resistor for detecting an alternating current that flows through the respective electrode unit 20. When an alternating-current voltage is applied to the electrode unit 20, the alternating current having a sinusoidal waveform flows through the electrode unit 20, so that the alternating current having the sinusoidal waveform is detected in the current detection unit 84. The current detection unit 84 outputs the detected alternating current to the amplifier 86. The amplifier 86 amplifies the current received from the current detection unit 84 and outputs the amplified current to the phase difference detection unit 85 and the rectification unit 87.

The phase difference detection unit 85 provided in the first voltage application unit 81 detects a phase difference between a phase of an alternating-current voltage applied to the first electrode 31 and the second electrode 32 and a phase of an alternating current that flows through the first electrode unit 30. Similarly, the phase difference detection unit 85 provided in the second voltage application unit 82 detects a phase difference between a phase of an alternating-current voltage applied to the third electrode 41 and the fourth electrode 42 and a phase of an alternating current that flows through the second electrode unit 40. The phase difference detection unit 85 transmits the detected phase difference to the control unit 500.

The rectification unit 87 is implemented by a diode, rectifies the alternating current received from the amplifier 86 to convert the rectified alternating current into a direct current, and outputs the direct current to the control unit 500. A voltage value of the direct current output from each rectification unit 87 to the control unit 500 is proportional to an amplitude of the alternating current that flows through each electrode unit 20.

As shown in FIGS. 1 and 2, the dielectric heating device 100 includes a current value detection unit 511 and an impedance detection unit 512. The current value detection unit 511 detects a unit current value representing a current value of the alternating current that flows through each electrode unit 20. Based on each unit current value detected by the current value detection unit 511 and each phase difference detected by each phase difference detection unit 85, the impedance detection unit 512 detects an impedance Z of each electrode unit 20. In the present embodiment, the current value detection unit 511 and the impedance detection unit 512 are functional units implemented by the CPU 510 of the control unit 500 executing a program stored in the storage unit 520.

In the present embodiment, based on a voltage value of a direct-current voltage received from the rectification unit 87, the control unit 500 that functions as the current value detection unit 511 detects an effective value of the current that flows through the electrode unit 20 as the unit current value. Based on the unit current value, the phase difference detected by the phase difference detection unit 85, and the voltage value of the alternating-current voltage applied to the electrodes of each electrode unit 20, the impedance detection unit 512 detects an impedance Zr of the electrode unit 20. For example, based on a unit current value of the first electrode unit 30, the phase difference detected by the phase difference detection unit 85 provided in the first voltage application unit 81, and a voltage value of the alternating-current voltage applied to the first electrode 31 and the second electrode 32, the impedance detection unit 512 detects the impedance Zr of the first electrode unit 30. As will be described later, the impedance Zr corresponds to an impedance of a circuit constituted by the electrode unit 20 and the to-be-heated object OH. Hereinafter, the impedance Zr of the first electrode unit 30 is also referred to as a first impedance Zr1. Further, the impedance Zr of the second electrode unit 40 is also referred to as a second impedance Zr2.

Figure 3:
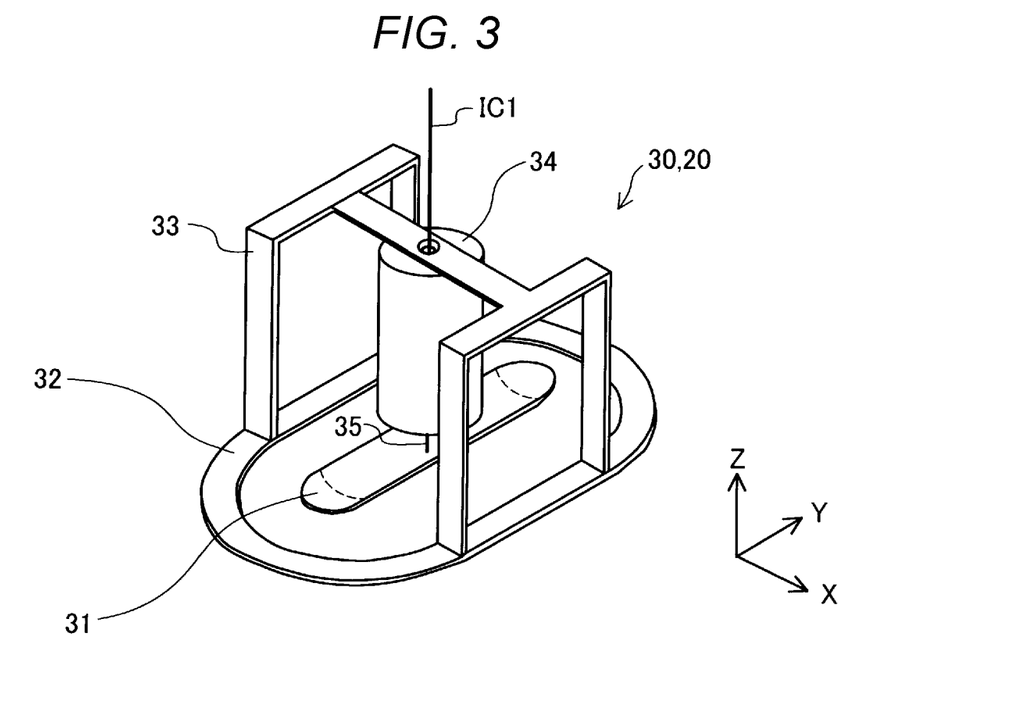
FIG. 3 is a perspective view showing a schematic configuration of an electrode unit.

FIG. 3 is a perspective view showing a schematic configuration of the first electrode unit 30 according to the present embodiment. As described above, the first electrode unit 30 includes the first electrode 31 and the second electrode 32. The first electrode unit 30 according to the present embodiment further includes a first coil 34. Although illustration is omitted, in the present embodiment, the third electrode 41 and the fourth electrode 42 of the second electrode unit 40 described above have configurations similar to those of the first electrode 31 and the second electrode 32, respectively. Further, the second electrode unit 40 includes a second coil (not shown) implemented similarly to the first coil 34. Hereinafter, when the first coil 34 and the second coil are not distinguished from each other, both the first coil 34 and the second coil may be simply referred to as a coil.

The first electrode 31 and the second electrode 32 are conductors, and are formed of, for example, a metal, an alloy, and a conductive oxide. The first electrode 31 and the second electrode 32 may be formed of materials the same as each other, or may be formed of materials different from each other. For example, in order to keep postures of the first electrode 31 and the second electrode 32 and secure strengths thereof, the first electrode 31 and the second electrode 32 may be disposed on a substrate or the like formed of a material having a low dielectric loss tangent and low conductivity, or may be supported by another member.

The first electrode 31 and the second electrode 32 are disposed such that a shortest distance between the first electrode 31 and the second electrode 32 is equal to or smaller than one-tenth of a wavelength of an electromagnetic field output from the first electrode unit 30. The first electrode 31 according to the present embodiment has a boat shape in which the Y direction is a longitudinal direction and the X direction is a lateral direction. A lower surface of the first electrode 31 has a curved surface shape convex in the −Z direction. When viewed from the Z direction, the first electrode 31 has an oval shape elongated in the Y direction. The second electrode 32 has an oval-shaped annular shape flat in the X direction and the Y direction and elongated in the Y direction. When viewed from the Z direction, the second electrode 32 surrounds a periphery of the first electrode 31.

As shown in FIG. 1, the first electrode 31 and the second electrode 32 are both disposed on a substrate 110 disposed in parallel to the X direction and the Y direction. More specifically, the first electrode 31 is disposed such that a central portion of the lower surface of the first electrode 31 in the X direction and the Y direction is in contact with an upper surface of the substrate 110. The second electrode 32 is disposed such that a lower surface of the second electrode 32 is in contact with the upper surface of the substrate 110. Therefore, in the present embodiment, the central portion of the lower surface of the first electrode 31 and the lower surface of the second electrode 32 are disposed on the same plane. In the present embodiment, the substrate 110 is provided in common to the first electrode unit 30 and the second electrode unit 40.

The first electrode 31 and the second electrode 32 both face the to-be-heated object OH, which is conveyed in the −Y direction by the conveyance unit 200, in the Z direction. In the present embodiment, the first electrode 31 and the second electrode 32 are disposed above the to-be-heated object OH. That is, in the present embodiment, the lower surfaces of the first electrode 31 and the second electrode 32 face the upper surface of the to-be-heated object OH. Further, the substrate 110 is disposed between the to-be-heated object OH and the first electrode 31 as well as the second electrode 32.

In the present embodiment, the substrate 110 is formed of glass. The substrate 110 prevents the liquid such as the ink applied to the to-be-heated object OH from adhering to the first electrode 31 and the second electrode 32, and prevents fluff of the to-be-heated object OH from adhering to the first electrode 31 and the second electrode 32 when the to-be-heated object OH is the cloth. In the present embodiment, similar to the above description, the substrate 110 also prevents the liquid or the fluff from adhering to the third electrode 41 and the fourth electrode 42 of the second electrode unit 40. In another embodiment, the substrate 110 may be formed of, for example, alumina.

Description will be returned to FIG. 3. In the present embodiment, the first electrode 31 is electrically coupled to the first voltage application unit 81 via a first electrical wire 35, the first coil 34, and an internal conductor IC1 of a coaxial cable. The second electrode 32 is electrically coupled to the first voltage application unit 81 via a coupling member 33 disposed at an upper portion of the second electrode 32, an external conductor (not shown) of the coaxial cable, and the like.

When the alternating-current voltage is applied to the first electrode 31 and the second electrode 32, an electromagnetic field having a wavelength $\lambda_1$ corresponding to the frequency $f_1$ of the applied alternating-current voltage is generated from the first electrode 31 and the second electrode 32. An intensity of the electromagnetic field is fairly high in the vicinity of the first electrode 31 and the second electrode 32, and is fairly low at a location far away from the first electrode 31 and the second electrode 32. In the present specification, the electromagnetic field generated in the vicinity of the first electrode 31 and the second electrode 32 because of applying the alternating-current voltage is also referred to as a "vicinity electromagnetic field". "In the vicinity of" the first electrode 31 and the second electrode 32 refers to a range in which a distance from the first electrode 31 and the second electrode 32 is equal to or smaller than ½ π of a wavelength of the generated electromagnetic field. A range in which a distance is farther than the "vicinity" is also referred to as "far". Further, in the present specification, an electromagnetic field generated far from the first electrode 31 and the second electrode 32 because of applying the alternating-current voltage is also referred to as a "far electromagnetic field". The far electromagnetic field corresponds to an electromagnetic field used in communication by a general communication antenna or the like.

As described above, the first electrode 31 and the second electrode 32 are disposed such that the shortest distance therebetween is equal to or smaller than one-tenth of the wavelength of the electromagnetic field. Accordingly, an electric field density of the electromagnetic field generated from the first electrode 31 and the second electrode 32 can be attenuated in the vicinity of the first electrode 31 and the second electrode 32. Therefore, by appropriately keeping the distance between the to-be-heated object OH and the first electrode 31 as well as the second electrode 32, it is possible to prevent radiation of the far electromagnetic field from the first electrode 31 and the second electrode 32 while efficiently heating the liquid that adheres to the to-be-heated object OH by the electric field generated in the vicinity of the first electrode 31 and the second electrode 32. Particularly, in the present embodiment, since the second electrode 32 surrounds the first electrode 31 when viewed from the Z direction, it is possible to further prevent the radiation of the far electromagnetic field from the first electrode 31 and the second electrode 32.

In the present embodiment, one end of the first coil 34 is electrically coupled in series to the first electrode 31 via the first electrical wire 35, and the other end of the first coil 34 is electrically coupled in series to the first voltage application unit 81 shown in FIGS. 1 and 2. In the present embodiment, the first coil 34 is implemented by a solenoid coil, and a length direction thereof is along the Z direction. A shape, a length, a cross-sectional area, the number of turns, a material, and the like of the first coil 34 are selected, for example, to form a resonant circuit that resonates at the frequency $f_1$ together with the first electrode 31 and the second electrode 32, and to implement impedance matching between the first electrode unit 30 and the first voltage application unit 81. Although illustration is omitted, in the present embodiment, one end of the second coil is electrically coupled to the third electrode 41 via a second electrical wire, and the other end of the second coil is electrically coupled in series to the second voltage application unit 82. In another embodiment, the one end of the first coil 34 may be coupled in series to the second electrode 32 instead of the first electrode 31. Further, similarly, one end of the second coil may be coupled in series to the fourth electrode 42 instead of the third electrode 41.

When the first voltage application unit 81 applies the alternating-current voltage to the first electrode unit 30, a high voltage is generated in the one end of the first coil 34. Accordingly, the intensity of the electric field generated from the first electrode 31 and the second electrode 32 can be increased. The first coil 34 is preferably disposed such that a distance between the one end of the first coil 34 and the first electrode 31 is as small as possible. When the distance between the one end of the first coil 34 and the first electrode 31 is long, the high voltage generated in the one end of the first coil 34 may generate an electric field, which does not contribute to the heating of the to-be-heated object OH, between the first coil 34 and the first electrode 31 or between the first electrical wire 35 and the second electrode 32, and an effect of increasing the intensity of the electric field generated from the first electrode 31 and the second electrode 32 may deteriorate. On the contrary, since it is possible to prevent the generation of such an electric field that does not contribute to the heating of the to-be-heated object OH by making the distance between the one end of the first coil 34 and the first electrode 31 short, the intensity of the electric field generated from the first electrode 31 and the second electrode 32 can be effectively increased. Similarly, the second coil can increase an intensity of an electric field generated from the third electrode 41 and the fourth electrode 42. In another embodiment, the first electrode unit 30 and the second electrode unit 40 may not include the coil, and for example, the first electrode 31 and the third electrode 41 may be formed in a meander shape to cause the first electrode 31 and the third electrode 41 to exhibit a function similar to that of the coil.

Figure 4:
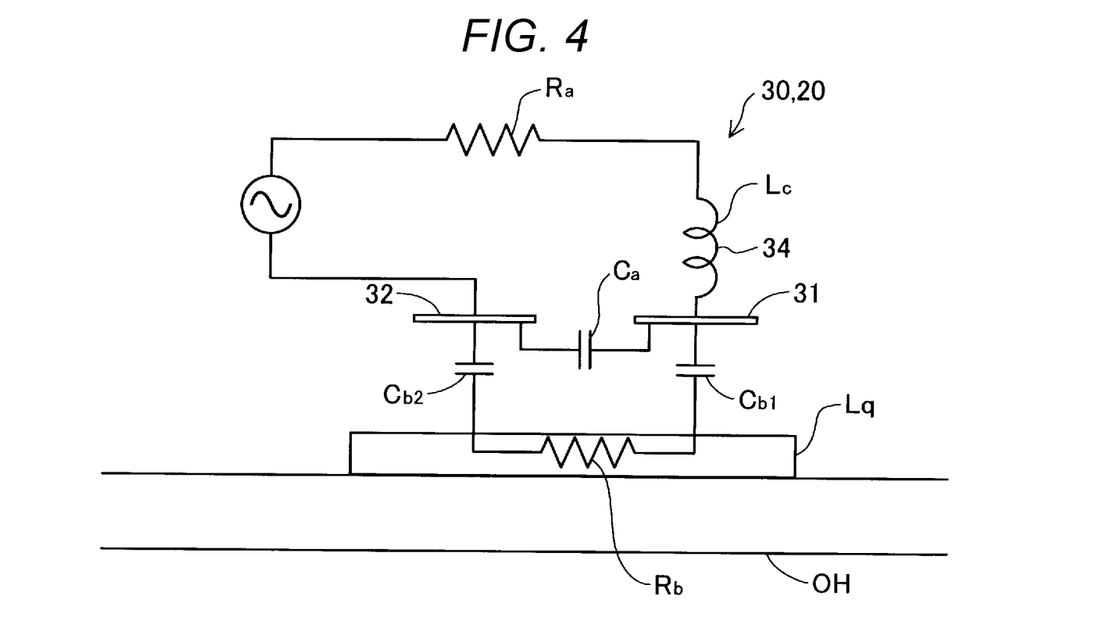
FIG. 4 is a schematic diagram showing a circuit constituted by the electrode unit and a to-be-heated object.
Figure 5:
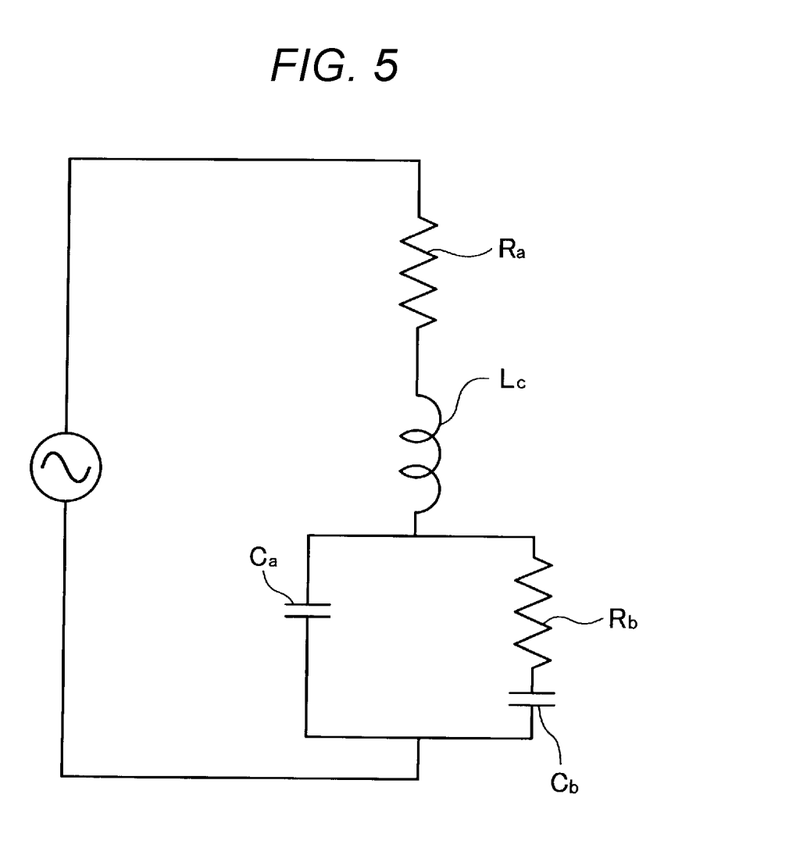
FIG. 5 is an equivalent circuit diagram of the dielectric heating device.

FIG. 4 is a schematic diagram showing a circuit constituted by the first electrode unit 30 according to the present embodiment and the to-be-heated object OH to which a liquid Lq adheres. FIG. 5 is an equivalent circuit diagram of the dielectric heating device 100 according to the present embodiment. In the circuit shown in FIGS. 4 and 5, the first electrode 31 and the second electrode 32 of the first electrode unit 30 can be regarded as electrode plates that constitute one capacitor. Although illustration is omitted, a circuit similar to the circuit shown in FIGS. 4 and 5 is constituted by the second electrode unit 40 and the to-be-heated object OH.

$R_a$ shown in FIGS. 4 and 5 represents resistance of the first electrode unit 30. $L_a$ shown in FIG. 5 represents inductance of the first electrode unit 30. In the present embodiment, the inductance $L_a$ includes an inductance $L_c$ of the first coil 34 shown in FIG. 4, and parasitic inductances of the electrodes of each electrode unit 20. $C_a$ shown in FIGS. 4 and 5 represents a capacitance of the first electrode unit 30. In the present embodiment, the capacitance $C_a$ includes a parasitic capacitance of the first coil 34, and a capacitance between the electrodes of each electrode unit 20. $R_b$ shown in FIGS. 4 and 5 represents electrical resistance of the liquid Lq such as the ink that adheres to the to-be-heated object OH. $C_{b1}$ shown in FIG. 4 represents a parasitic capacitance between the first electrode 31 and the liquid Lq. $C_{b2}$ shown in FIG. 4 represents a parasitic capacitance between the second electrode 32 of the electrode unit 20 and the liquid Lq. $C_b$ shown in FIG. 5 is expressed as a sum of the parasitic capacitances $C_{b1}$ and $C_{b2}$.

When the liquid Lq on the to-be-heated object OH is heated and dried, the capacitance $C_a$ of the electrode unit 20 and the resistance $R_b$ of the liquid Lq change. More specifically, when a thickness of the liquid Lq on the to-be-heated object OH decreases as the liquid Lq is dried, a capacitance of a capacitor implemented by the first electrode 31 and the second electrode 32 decreases, and therefore the capacitance $C_a$ decreases. This is because a dielectric constant of the liquid Lq is higher than a dielectric constant of a vacuum. Further, for example, in a case where the liquid Lq is a liquid containing water such as the aqueous ink, when a water content of the liquid Lq decreases due to the drying, electrical conductivity of the liquid Lq decreases, and therefore the resistance $R_b$ increases. The "water content of liquid Lq" refers to a mass fraction of the water in the liquid Lq. Although the capacitance $C_b$ also decreases due to the drying of the liquid Lq, a decrease amount thereof can be ignored because the decrease amount is smaller than a decrease amount of the capacitance $C_a$ and an increase amount of the resistance $R_b$.

The impedance Z of the equivalent circuit shown in FIG. 5 is expressed by the following Equation (1).

$$Z = Ra + jwLa + \cfrac{1}{jw\left(Ca + \cfrac{Cb}{jwRbCb + 1}\right)} \quad (1)$$

In Equation (1) described above, w represents an angular frequency of the alternating-current voltage applied to the first electrode 31 and the second electrode 32.

Figure 6:
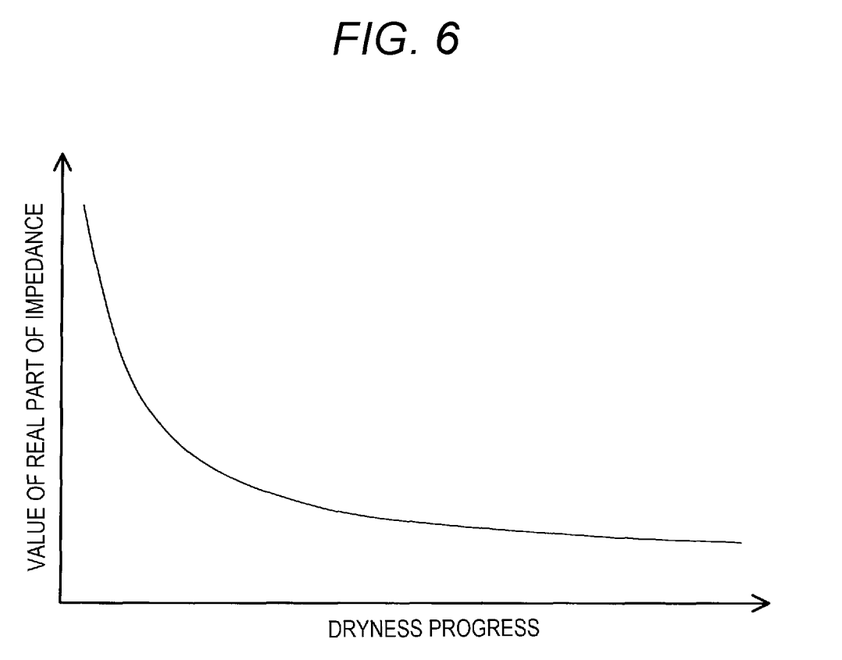
FIG. 6 is a graph showing a change in an impedance of the equivalent circuit.

FIG. 6 is a graph showing a change in the impedance Z due to progress in drying the liquid Lq in the equivalent circuit shown in FIG. 5. More specifically, FIG. 6 is a graph in which a value of a real part of the impedance Z is set as a vertical axis and a progress degree of drying the liquid Lq is set as a horizontal axis when cotton-made cloth is used as the to-be-heated object OH and a yellow aqueous ink is used as the liquid Lq. The "progress degree of drying" shown in FIG. 6 represents a reciprocal of the water content of the liquid Lq. The graph of FIG. 6 is created by calculating a relationship between the water content of the liquid Lq and the capacitance $C_a$ as well as the resistance $R_b$ by simulation, and plotting the value of the real part of the impedance Z calculated by substituting the calculated values of the capacitance $C_a$ and the resistance $R_b$ into Equation (1) described above with respect to the reciprocal of the water content. FIG. 6 shows that the value of the real part of the impedance Z decreases as the drying of the liquid Lq on the to-be-heated object OH progresses, that is, as the water content of the liquid Lq decreases. In this way, the impedance Z and dryness degree of the to-be-heated object OH correlate with each other.

The control unit 500 shown in FIGS. 1 and 2 described above controls output of alternating-current power output to the first electrode unit 30 by controlling the first voltage application unit 81 based on the first impedance Zr detected by the impedance detection unit 512. Hereinafter, the alternating-current power output to the first electrode unit 30 is also referred to as first alternating-current power. Since the impedance Zr corresponds to an actually measured value of the impedance of the circuit constituted by the electrode unit 20 and the to-be-heated object OH, similar to the impedance Z of the equivalent circuit described above, the impedance Zr correlates with the dryness degree of the to-be-heated object OH. Therefore, a heating amount of the to-be-heated object OH is adjusted according to the dryness degree of the to-be-heated object OH by controlling output of the first alternating-current power based on the first impedance Zr1. Similarly, in the present embodiment, the control unit 500 controls output of the alternating-current power output to the second electrode unit 40 by controlling the second voltage application unit 82 based on the second impedance Zr2. Hereinafter, the alternating-current power output to the second electrode unit 40 is also referred to as second alternating-current power.

In the present embodiment, the control unit 500 controls the output of the first alternating-current power based on a value of a real part of the first impedance Zr1. More specifically, the control unit 500 first estimates the dryness degree of the to-be-heated object OH by estimating an amount of the liquid contained in the to-be-heated object OH based on the value of the real part of the first impedance Zr1. The control unit 500 causes the storage unit 520 to store the estimated dryness degree, and controls the output of the alternating-current power based on the stored dryness degree. The amount of the liquid estimated in this way corresponds to an amount of a liquid in the vicinity of the first electrode 31 and the second electrode 32 in the liquid that adheres to the to-be-heated object OH. For example, the amount of the liquid contained in the to-be-heated object OH may be estimated as a weight, a volume, or a thickness of the liquid, or may be estimated as a ratio of a predetermined weight or the like to a reference value.

More specifically, in the present embodiment, the control unit 500 estimates the dryness degree of the to-be-heated object OH by estimating a moisture content of the liquid applied to the to-be-heated object OH as the amount of the liquid contained in the to-be-heated object OH based on the value of the real part of the first impedance Zr1. The control unit 500 estimates the moisture content of the liquid by, for example, referring to a relationship between a value of the real part of the impedance predetermined based on an experiment and the moisture content of the liquid based on the value of the real part of the detected first impedance Zr1. In this case, the relationship between the value of the real part of the impedance and the moisture content of the liquid may be determined, for example, for each material or thickness of the to-be-heated object OH or each type of the liquid.

In the present embodiment, similar to controlling the output of the first alternating-current power based on the value of the real part of the first impedance Zr1, the control unit 500 controls the output of the second alternating-current power based on a value of a real part of the second impedance Zr2. A liquid content estimated based on the second impedance Zr2 corresponds to an amount of a liquid in the vicinity of the third electrode 41 and the fourth electrode 42 in the liquid that adheres to the to-be-heated object OH.

Figure 7:
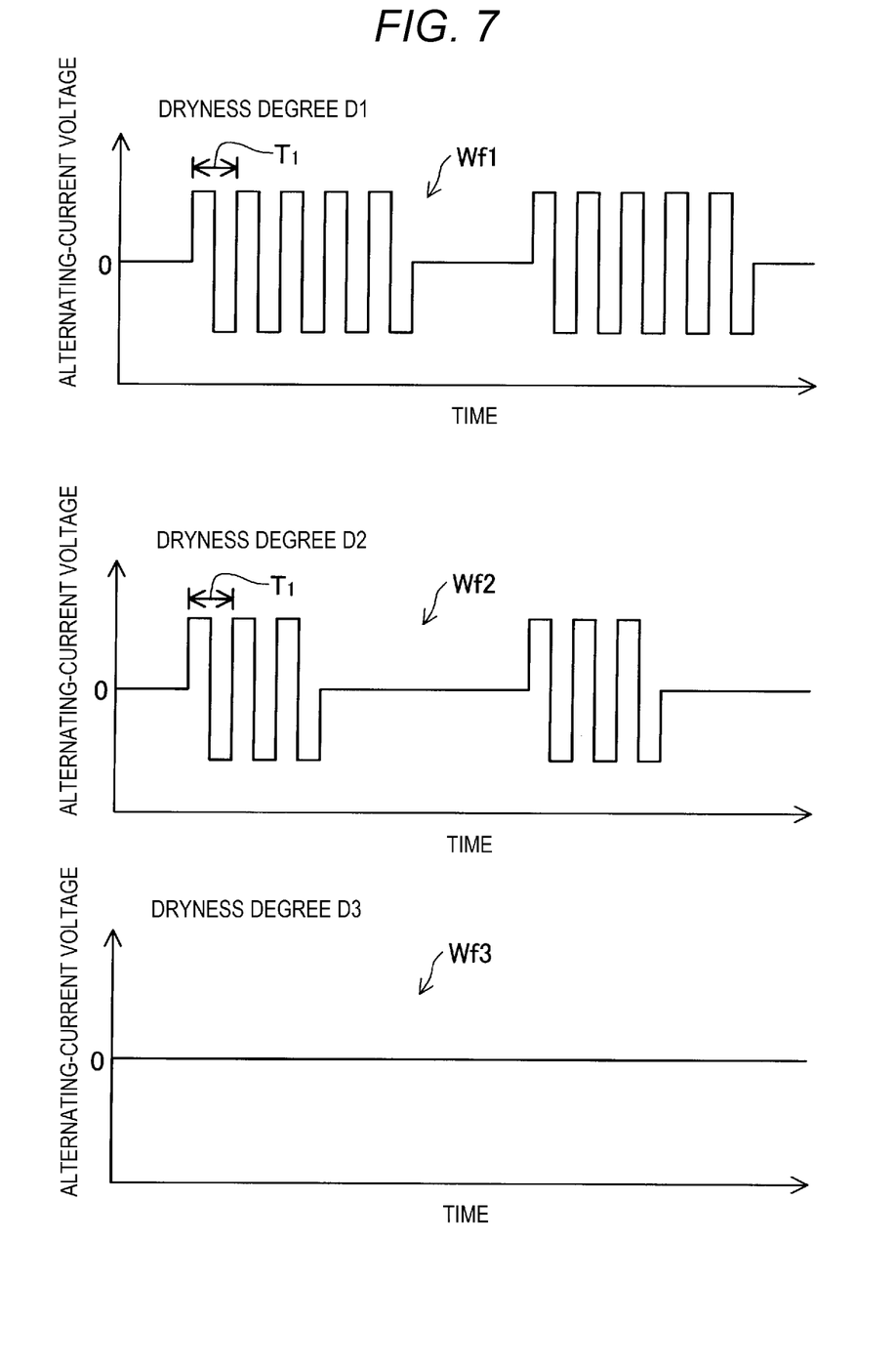
FIG. 7 is a diagram showing an example of output control of a first alternating-current voltage performed by a control unit.

FIG. 7 is a diagram showing an example of output control of the first alternating-current voltage performed by the control unit 500 according to the present embodiment. FIG. 7 shows a waveform Wf1, a waveform Wf2, and a waveform Wf3 as examples of a waveform of the first alternating-current voltage. As shown in FIG. 7, the control unit 500 outputs, to the first electrode unit 30, an alternating-current voltage of the waveform Wf1 when the dryness degree is D1, an alternating-current voltage of the waveform Wf2 when the dryness degree is D2, and an alternating-current voltage of the waveform Wf3 when the dryness degree is D3. The dryness degree increases in an order of D1, D2, and D3. FIG. 7 shows a period $T_1$ of the alternating-current voltage. The period $T_1$ is a reciprocal of the frequency $f_1$, and is proportional to the wavelength $\lambda_1$.

The control unit 500 according to the present embodiment controls the output of the first alternating-current power by causing the inverter 83 of the first voltage application unit 81 to intermittently operate based on the first impedance Zr1. More specifically, in the present embodiment, based on the dryness degree estimated based on the first impedance Zr1, the control unit 500 changes a ratio of time during which the inverter 83 is continuously operated to output the alternating-current voltage of the frequency $f_1$ to the first electrode unit 30 and a ratio of time during which the inverter 83 is not operated and the output of the voltage to the first electrode unit 30 is stopped to a predetermined time. More specifically, when the dryness degree is higher, the control unit 500 decreases the ratio of the time during which the alternating-current voltage is output to the first electrode unit 30, and increases the ratio of the time during which the output of the voltage to the first electrode unit 30 is stopped. On the contrary, when the dryness degree is lower, the control unit 500 increases the ratio of the time during which the alternating-current voltage is output to the first electrode unit 30, and decreases the ratio of the time during which the output of the voltage to the first electrode unit 30 is stopped. For example, since the dryness degree D2 is higher than the dryness degree D1, in the waveform Wf2, the ratio of the time during which the alternating-current voltage is output to the first electrode unit 30 is smaller and the ratio of the time during which the voltage is not output to the first electrode unit 30 is larger than in the waveform Wf1. In this way, the output of the first alternating-current power is controlled. Although illustration is omitted, in the present embodiment, the control unit 500 similarly controls the output of the second alternating-current power by controlling the inverter 83 of the second voltage application unit 82 based on the second impedance Zr2.

In the present embodiment, when the dryness degree estimated based on the first impedance Zr is equal to or higher than a predetermined degree, the control unit 500 sets the output of the first alternating-current power to 0. More specifically, when the dryness degree is equal to or higher than a reference dryness degree Ds, the control unit 500 sets the output of the first alternating-current power to 0. The reference dryness degree Ds is determined as, for example, a dryness degree indicating that the to-be-heated object OH is sufficiently dried. In the example of FIG. 7, the dryness degrees D1 and D2 are lower than the reference dryness degree Ds, and the dryness degree D3 is equal to or higher than the reference dryness degree Ds. Therefore, in the present embodiment, when the dryness degree is D3, the control unit 500 controls the inverter 83 to set the output of the first alternating-current power to 0 by setting the ratio of the time during which the alternating-current voltage is output to the first electrode unit 30 to 0 to a predetermined time. For example, after the output of the first alternating-current power is once set to 0, when the to-be-heated object OH is conveyed, and in a case where a portion of the to-be-heated object OH in which an amount of the liquid that adheres to the to-be-heated object OH is relatively large is in the vicinity of the first electrode unit 30, the dryness degree estimated based on the impedance Zr may be lower than the reference dryness degree Ds again. In this case, the control unit 500 makes the output of the first alternating-current power larger than 0 again. Further, in the present embodiment, when the dryness degree estimated based on the second impedance Zr2 is equal to or higher than the reference dryness degree Ds, the control unit 500 similarly sets the output of the second alternating-current power to 0.

In the present embodiment, the control unit 500 estimates a temperature of the to-be-heated object OH based on the detected impedance Zr. The control unit 500 can estimate the temperature of the to-be-heated object OH based on, for example, a cumulative value of a heat generation amount estimated based on the impedance Zr. More specifically, the control unit 500 estimates a heat generation amount at a certain time point by referring to a relationship between the impedance predetermined by the experiment and a heat generation amount of the liquid that adheres to the to-be-heated object OH based on the impedance Zr at the time point. The control unit 500 can estimate the cumulative value of the heat generation amount described above by calculating a time integrated value of a heat generation amount at a time point from start of heating to a current time based on the estimated heat generation amount. Accordingly, the control unit 500 can estimate the temperature of the to-be-heated object OH by estimating a temperature of the liquid based on specific heat of the liquid and the estimated cumulative value of the heat generation amount.

In the present embodiment, when a dryness degree of the to-be-heated object OH in the vicinity of the first electrode unit 30 is lower than a dryness degree of the to-be-heated object OH in the vicinity of the second electrode unit 40, the control unit 500 makes the output of the first alternating-current power larger than the output of the second alternating-current power. On the contrary, when the dryness degree in the vicinity of the first electrode unit 30 is higher than the dryness degree in the vicinity of the second electrode unit 40, the control unit 500 makes the output of the first alternating-current power smaller than the output of the second alternating-current power. Accordingly, in the to-be-heated object OH, a heating amount of a portion having a lower dryness degree can be increased, and a heating amount of a portion having a higher dryness degree can be decreased. Therefore, even if there is a variation in an adhesion amount of the liquid on the to-be-heated object OH, there is a high possibility that the to-be-heated object OH can be uniformly heated. In the present embodiment, the first voltage application unit 81 and the second voltage application unit 82 are individually controlled based on the dryness degree as described using FIG. 7, so that a magnitude relationship between the output of the first alternating-current power and the output of the second alternating-current power described above is implemented. In another embodiment, for example, the control unit 500 may compare the dryness degree in the vicinity of the first electrode unit 30 with the dryness degree in the vicinity of the second electrode unit 40, and change the magnitude relationship between the output of the first alternating-current power and the output of the second alternating-current power based on a comparison result thereof.

According to the dielectric heating device 100 in the first embodiment described above, the control unit 500 controls the output of the first alternating-current power by controlling the first voltage application unit 81 based on the impedance Zr of the first electrode unit 30 including the first electrode 31 and the second electrode 32 facing the to-be-heated object OH. According to such an aspect, since the output of the first alternating-current power is controlled based on the impedance Zr correlated with the dryness degree of the to-be-heated object OH, the output of the first alternating-current power is adjusted according to the dryness degree. Therefore, even if the sensor for measuring the water content of the to-be-heated object OH is not provided at a position corresponding to the to-be-heated object OH, the heating amount of the to-be-heated object OH can be adjusted according to the dryness degree of the to-be-heated object OH.

According to the present embodiment, the control unit 500 estimates the dryness degree of the to-be-heated object OH based on the impedance of the first electrode unit 30, and causes the storage unit 520 to store the estimated dryness degree. Accordingly, the dryness degree stored in the storage unit 520 can be displayed on a display unit (not shown), and the output of the first alternating-current power can be controlled based on the dryness degree stored in the storage unit 520.

According to the present embodiment, when the dryness degree of the to-be-heated object OH is equal to or higher than a predetermined degree, the control unit 500 sets the output of the first alternating-current power to 0. Accordingly, it is possible to prevent discoloration, burning, or the like of the to-be-heated object OH due to the to-be-heated object OH being heated in a sufficiently dried state.

According to the present embodiment, the control unit 500 estimates the temperature of the to-be-heated object OH based on the first impedance Zr1. Therefore, the temperature of the to-be-heated object OH can be acquired without providing the temperature sensor for measuring the temperature of the to-be-heated object OH. Accordingly, for example, when the ink that adheres to the to-be-heated object OH contains a resin component for fixing a component such as a pigment contained in the ink to the to-be-heated object OH, a melting degree of the resin component can be estimated based on the estimated temperature of the to-be-heated object OH.

According to the present embodiment, the first electrode unit 30 includes the first coil 34 electrically coupled in series to either one of the first electrode 31 and the second electrode 32. According to this, the first coil 34 can increase the intensity of the electric field generated from the first electrode 31 and the second electrode 32 during the voltage application. Therefore, the to-be-heated object OH can be heated more efficiently.

According to the present embodiment, the first voltage application unit 81 includes the inverter 83 that converts the direct-current voltage output from the direct-current power supply 150 into the alternating-current voltage to output the alternating-current voltage to the first electrode unit 30. Accordingly, as compared with a case where the first voltage application unit 81 is implemented by, for example, a high-frequency power supply circuit including an analog amplifier and a transformer, there is a high possibility that the first voltage application unit 81 can be miniaturized, and electric power efficiency can be improved.

According to the present embodiment, the control unit 500 controls the output of the first alternating-current power by causing the inverter 83 to intermittently operate based on the impedance of the first electrode unit 30. Therefore, the output of the first alternating-current power can be easily controlled.

B. Second Embodiment

Figure 8:
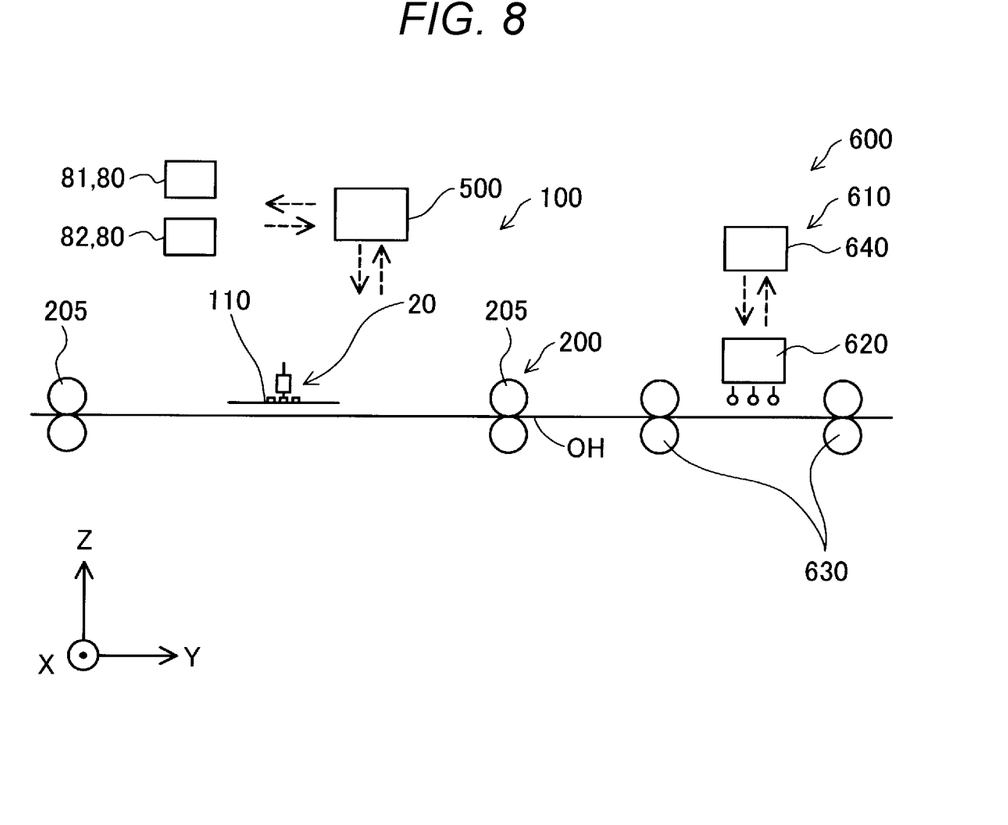
FIG. 8 is a diagram showing a schematic configuration of a printing system.

FIG. 8 is a diagram showing a schematic configuration of a printing system 600 as a second embodiment. The printing system 600 includes the dielectric heating device 100 described in the first embodiment and a liquid-discharging device 610.

The liquid-discharging device 610 according to the present embodiment is implemented as an inkjet printer, and includes a discharging unit 620 that discharges a liquid to a printing medium, a medium conveyance unit 630 that conveys the printing medium, and a discharging control unit 640 that controls the discharging unit 620 and the medium conveyance unit 630. The discharging unit 620 is implemented by, for example, a liquid-discharging head of a piezo-type or a thermal-type. Similar to the conveyance unit 200, the medium conveyance unit 630 is implemented by, for example, rollers. Similar to the control unit 500 of the dielectric heating device 100, the discharging control unit 640 is implemented by, for example, a computer. The discharging control unit 640 discharges the liquid to the printing medium and causes the liquid to adhere to the printing medium while conveying the printing medium by controlling the discharging unit 620 and the medium conveyance unit 630.

As described in the first embodiment, the dielectric heating device 100 heats, as the to-be-heated object OH, the printing medium to which the liquid discharged by the discharging unit 620 adheres. That is, the first electrode unit 30 and the second electrode unit 40 heat, as the to-be-heated object OH, the printing medium to which the liquid adheres. As shown in FIG. 8, the to-be-heated object OH may be continuously conveyed from the liquid-discharging device 610 to the dielectric heating device 100. In this case, for example, the conveyance unit 200 of the dielectric heating device 100 may function as the medium conveyance unit 630. Further, the to-be-heated object OH may not be continuously conveyed from the liquid-discharging device 610 to the dielectric heating device 100. For example, after the printing medium to which the liquid discharged by the liquid-discharging device 610 adheres is once wound in a roll shape, the wound printing medium may be moved to the dielectric heating device 100 by a robot or the like. In this case, the roll-shaped printing medium is conveyed by the conveyance unit 200 as the to-be-heated object OH while being unwound, so that the to-be-heated object OH can be heated in the dielectric heating device 100.

According to the second embodiment described above, even if a sensor for measuring a water content of the to-be-heated object OH is not provided at a position corresponding to the to-be-heated object OH, a heating amount of the to-be-heated object OH can be adjusted according to a dryness degree of the to-be-heated object OH.

C. Other Embodiments (C-1) In the embodiments described above, although the control unit 500 estimates the dryness degree of the to-be-heated object OH based on the detected impedance Zr, the control unit 500 may not estimate the dryness degree of the to-be-heated object OH.

(C-2) In the embodiments described above, the control unit 500 estimates the dryness degree by estimating the amount of the liquid contained in the to-be-heated object OH based on the detected impedance Zr. On the contrary, the control unit 500 may estimate the dryness degree without estimating the amount of the liquid contained in the to-be-heated object OH.

(C-3) In the embodiments described above, when the dryness degree estimated based on the first impedance Zr is equal to or higher than the reference dryness degree Ds, the control unit 500 sets the output of the first alternating-current power to 0. On the contrary, when the dryness degree estimated based on the first impedance Zr is equal to or higher than the reference dryness degree Ds, the control unit 500 may not set the output of the first alternating-current power to 0. Similarly, when the dryness degree estimated based on the second impedance Zr2 is equal to or higher than the reference dryness degree Ds, the control unit 500 may not set the output of the second alternating-current power to 0.

(C-4) In the embodiments described above, the control unit 500 estimates the temperature of the to-be-heated object OH based on the impedance Zr. On the contrary, the control unit 500 may not estimate the temperature of the to-be-heated object OH based on the impedance Zr.

(C-5) In the embodiments described above, the first voltage application unit 81 includes the inverter 83. On the contrary, the first voltage application unit 81 may not include the inverter 83, and may be implemented as, for example, a high-frequency power supply circuit including an analog amplifier and a transformer. Similarly, the second voltage application unit 82 may not include the inverter 83.

(C-6) In the embodiments described above, the control unit 500 controls the output of the first alternating-current power by causing the inverter 83 to intermittently operate based on the first impedance Zr1. On the contrary, the control unit 500 may not control the output of the first alternating-current power by causing the inverter 83 to intermittently operate. For example, the control unit 500 may control the output of the first alternating-current power by changing an amplitude of the alternating-current voltage applied to the first electrode unit 30 based on the first impedance Zr1. Similarly, the control unit 500 may not control the output of the second alternating-current power by causing the inverter 83 to intermittently operate based on the second impedance Zr2.

(C-7) In the embodiments described above, the first electrode unit 30 and the second electrode unit 40 are provided as the electrode unit 20, and the first voltage application unit 81 and the second voltage application unit 82 are provided as the voltage application unit 80. In addition, one or more other electrode units 20 may be provided as the electrode unit 20, and one or more other voltage application units 80 that apply the alternating-current voltage to the respective electrode units 20 may be provided as the voltage application unit 80. Further, only the first electrode unit 30 may be provided as the electrode unit 20, and only the first voltage application unit 81 may be provided as the voltage application unit 80.

(C-8) In the embodiments described above, when the printing medium to which the liquid adheres is heated as the to-be-heated object OH, the control unit 500 may control the output of the alternating-current power output to the electrode unit 20 by controlling the voltage application unit 80 based on printing information on the printing medium. In this case, the printing information may include, for example, any one of information on a type of the liquid that adheres to the to-be-heated object OH, adhesion amount information on an adhesion amount of the liquid, and pattern information on a printing pattern. According to this, since the output of the alternating-current power adjusted based on the impedance Zr can be further adjusted based on the printing information, there is a higher possibility that the to-be-heated object OH can be dried uniformly. For example, the printing information may be stored in the storage unit 520 in advance, or may be acquired from the liquid-discharging device 610.

(C-9) In the embodiments described above, when viewed from the Z direction, the second electrode 32 surrounds the first electrode 31. On the contrary, for example, the first electrode 31 and the second electrode 32 may be adjacent to each other when viewed from the Z direction, or may be disposed such that the to-be-heated object OH is sandwiched by the first electrode 31 and the second electrode 32 in the Z direction. In this case, shapes of the first electrode 31 and the second electrode 32 may be freely selected, and may be circular, oval, rectangular, polygonal, or the like. Further, when viewed from the Z direction, areas of the first electrode 31 and the second electrode 32 may be the same as or different from each other. When viewed from the Z direction, the first electrode 31 and the second electrode 32 preferably do not overlap each other. Similarly, for example, the third electrode 41 and the fourth electrode 42 may be adjacent to each other when viewed from the Z direction, or may be disposed such that the to-be-heated object OH is sandwiched by the third electrode 41 and the fourth electrode 42 in the Z direction.

(C-10) In the embodiments described above, the electrode unit 20 may be capable of reciprocating in a direction intersecting the direction in which the to-be-heated object OH is conveyed. For example, the electrode unit 20 may be supported by a drive unit (not shown) implemented by a belt mechanism or a ball screw mechanism, and may be reciprocated in the X direction.

(C-11) In the embodiments described above, the control unit 500 controls the output of the alternating-current power output to the electrode unit 20 based on the value of the real part of the impedance Zr. On the contrary, the control unit 500 may control the output of the alternating-current power based on, for example, a value of an imaginary part of the impedance Zr, or an absolute value of the impedance Zr represented as a vector sum of a real part and an imaginary part on a complex plane, in addition to or instead of using the value of the real part of the impedance Zr. Accordingly, for example, even if the dryness degree is not uniquely determined based on only the value of the real part of the impedance Zr depending on a type of the liquid that adheres to the to-be-heated object OH or the like, the output of the alternating-current power output to the electrode unit 20 can be appropriately controlled. This is because the value of the imaginary part of the impedance Zr changes periodically, more specifically, in a direction rotating counterclockwise on the Smith chart due to progress in drying the liquid on the to-be-heated object OH. In this case, for example, first, candidates for the dryness degree may be extracted based on the value of the real part of the impedance Zr, and then one dryness degree may be estimated from the extracted candidates based on the value of the imaginary part of the impedance Zr.

(C-12) In the embodiments described above, the high-frequency voltage is applied to the electrode unit 20. On the contrary, a frequency of the alternating-current voltage applied to the electrode unit 20 may not be a high frequency as long as it is a frequency that can heat the to-be-heated object OH. The frequency of the alternating-current voltage in this case is preferably, for example, 100 kHz or more and less than 1 MHz.

D. Other Aspects

The present disclosure is not limited to the above-described embodiments, and can be implemented in various aspects without departing from the spirit of the present disclosure. For example, the present disclosure can be implemented in the following aspects. In order to solve a part of or all of problems of the present disclosure, or in order to achieve a part of or all of effects of the present disclosure, technical features of the embodiments described above corresponding to technical features in the following aspects can be replaced or combined appropriately. Further, technical features can be deleted appropriately unless the technical features are described as essential in the present specification.

(1) According to a first aspect of the present disclosure, a dielectric heating device is provided. The dielectric heating device includes: an electrode unit including a first electrode and a second electrode that face a to-be-heated object, and configured to heat the to-be-heated object; a voltage application unit configured to apply an alternating-current voltage to the first electrode and the second electrode; a current value detection unit configured to detect a current value of an alternating current that flows through the electrode unit; a phase difference detection unit configured to detect a phase difference between the alternating-current voltage and the alternating current; an impedance detection unit configured to detect an impedance of the electrode unit based on the current value and the phase difference; and a control unit configured to control output of alternating-current power output to the electrode unit by controlling the voltage application unit based on the impedance.

According to such an aspect, since the output of the alternating-current power output to the electrode unit is controlled based on the impedance of the electrode unit correlated with a dryness degree, the output of the alternating-current power output to the electrode unit is controlled according to the dryness degree. Therefore, even if a sensor for measuring a water content of the to-be-heated object is not provided at a position corresponding to the to-be-heated object, a heating amount of the to-be-heated object can be adjusted according to the dryness degree of the to-be-heated object.

(2) In the above-described aspect, the dielectric heating device may further include a storage unit, and the control unit may estimate a dryness degree of the to-be-heated object based on the impedance, and may cause the storage unit to store the estimated dryness degree. According to such an aspect, the dryness degree stored in the storage unit can be displayed on a display unit, and the output of the alternating-current power applied to the electrode unit can be controlled based on the dryness degree stored in the storage unit.

(3) In the above-described aspect, the control unit may estimate the dryness degree by estimating an amount of a liquid contained in the to-be-heated object based on the impedance.

(4) In the above-described aspect, when the dryness degree is equal to or higher than a predetermined degree, the control unit may set the output of the alternating-current power to 0. According to such an aspect, it is possible to prevent discoloration, burning, or the like of the to-be-heated object due to the to-be-heated object being heated in a sufficiently dried state.

(5) In the above-described aspect, the control unit may estimate a temperature of the to-be-heated object based on the impedance. According to such an aspect, it is possible to acquire the temperature of the to-be-heated object without providing a temperature sensor for measuring the temperature of the to-be-heated object.

(6) In the above-described aspect, the electrode unit may include a coil electrically coupled in series to either one of the first electrode and the second electrode. According to such an aspect, the coil can increase an intensity of an electric field generated from the first electrode and the second electrode during the voltage application. Therefore, the to-be-heated object can be heated more efficiently.

(7) In the above-described aspect, the voltage application unit may include an inverter configured to convert a direct-current voltage received from a direct-current power supply into an alternating-current voltage to output the alternating-current voltage to the electrode unit. According to such an aspect, there is a high possibility that the voltage application unit can be miniaturized, and electric power efficiency can be improved.

(8) In the above-described aspect, the control unit may control the output of the alternating-current power by causing the inverter to intermittently operate based on the impedance. According to such an aspect, the output of the alternating-current power output to the electrode unit can be easily controlled.

(9) According to a second aspect of the present disclosure, a printing system is provided. The printing system includes the dielectric heating device according to the above-described aspect; and a discharging unit configured to discharge a liquid to a printing medium and to cause the liquid to adhere to the printing medium. The electrode unit heats the printing medium to which the liquid adheres as the to-be-heated object.

What is claimed is:

1. A dielectric heating device comprising:
   an electrode unit including a first electrode and a second electrode that face a to-be-heated object, and configured to heat the to-be-heated object;
   a voltage application unit configured to apply an alternating-current voltage to the first electrode and the second electrode;
   a current value detection unit configured to detect a current value of an alternating current that flows through the electrode unit;
   a phase difference detection unit configured to detect a phase difference between the alternating-current voltage and the alternating current;
   an impedance detection unit configured to detect an impedance of the electrode unit based on the current value and the phase difference; and
   a control unit configured to control output of alternating-current power output to the electrode unit by controlling the voltage application unit based on the impedance, wherein
   the electrode unit includes a coil electrically coupled in series to either one of the first electrode and the second electrode.

2. The dielectric heating device according to claim 1, further comprising:
   a storage unit, wherein
   the control unit estimates a dryness degree of the to-be-heated object based on the impedance, and causes the storage unit to store the estimated dryness degree.

3. The dielectric heating device according to claim 2, wherein
   the control unit estimates the dryness degree by estimating an amount of a liquid contained in the to-be-heated object based on the impedance.

4. The dielectric heating device according to claim 2, wherein
   when the dryness degree is equal to or higher than a predetermined degree, the control unit sets the output of the alternating-current power to 0.

5. The dielectric heating device according to claim 1, wherein
   the control unit estimates a temperature of the to-be-heated object based on the impedance.

6. The dielectric heating device according to claim 1, wherein
   the voltage application unit includes an inverter configured to convert a direct-current voltage received from a direct-current power supply into the alternating-current voltage to output the alternating-current voltage to the electrode unit.

7. The dielectric heating device according to claim 6, wherein
   the control unit controls the output of the alternating-current power by causing the inverter to intermittently operate based on the impedance.

8. A printing system comprising:
   the dielectric heating device according to claim 1; and
   a discharging unit configured to discharge a liquid to a printing medium and to cause the liquid to adhere to the printing medium, wherein the electrode unit heats the printing medium to which the liquid adheres as the to-be-heated object.

* * * * *